United States Patent [19]

Takasaki et al.

[11] 4,080,580
[45] Mar. 21, 1978

[54] VARIABLE EQUALIZER

[75] Inventors: Yoshitaka Takasaki, Tokorozawa; Yasuhiro Kita, Hachioji; Jun'ichi Nakagawa, Tokorozawa; Kohei Ishizuka, Hachioji; Osamu Yumoto, Kokubunji; Yoshinori Nagoya, Yokohama, all of Japan

[73] Assignee: Hitachi, Ltd., Japan

[21] Appl. No.: 738,901

[22] Filed: Nov. 4, 1976

[30] Foreign Application Priority Data

Nov. 7, 1975 Japan .................. 50-133072

[51] Int. Cl.² ............................................. H03H 7/14
[52] U.S. Cl. .................................. 333/28 R; 330/103; 330/151
[58] Field of Search .......................... 333/14, 18, 28 R; 330/103, 151

[56] References Cited

U.S. PATENT DOCUMENTS

| 2,981,892 | 4/1961 | Franks et al. ............... 333/28 R X |
| 3,624,539 | 11/1971 | Kao et al. ................... 333/28 R X |
| 3,939,437 | 2/1976 | Adam ............................ 330/151 X |
| 4,004,253 | 1/1977 | Takasaki et al. .............. 333/28 R |

Primary Examiner—Paul L. Gensler
Attorney, Agent, or Firm—Craig & Antonelli

[57] ABSTRACT

In order to realize a precision variable equalizer of little errors by a simple circuit arrangement, a plurality of variable transmission circuits having variable transfer coefficients are connected in series between input and output terminals, and feed-back and feed-forward are applied from input and output sides of the respective variable transmission circuits to input and output portions of the variable equalizer through transmission networks having specified transfer characteristics.

6 Claims, 7 Drawing Figures

COMPENSATION ERROR OF A BODE EQUALIZER

COMPENSATION ERROR OF AN IMPROVED EQUALIZER

VARIABLE EQUALIZER

BACKGROUND OF THE INVENTION

1. Field of the Invention

This invention relates to a variable equalizer which, when the frequency characteristic of a transmission line has changed in an electrical communication system, is capable of varying the frequency characteristic in order to compensate for the characteristic change.

2. Description of the Prior Art

In a wire communication system employing a coaxial cable, a pair cable or the like, the transmission characteristic of the cable varies depending in dependence on the length of the transmission distance, fluctuations in the ambient temperature, etc. It is therefore necessary to make compensation for this variation with some networks equipped in repeaters.

The response of the transmission line vs. frequency, when represented in decibel, changes in proportional to the reference characteristic which is inherent to the transmission line.

For compensating for the characteristic changes or gain changes, the Bode type variable equalizer (refer to, for example, H. W. Bode, "Variable Equalizer," Bell Syst. Tech. J., Vol. 17, No. 2, pp. 229 - 244, 1938) is often used. The transfer characteristic $e^\psi$ of this variable equalizer is represented as follows, by letting $x$ denote a variable coefficient and $e^\phi$ (where $\phi$ is a function of the length and the frequency) denote variable reference characteristic:

$$e^\psi = \frac{x + e^\phi}{1 + e^\phi} \quad (1)$$

Expanding $\psi$ in terms of $\phi$ yields:

$$\psi = \frac{1-x}{1+x} \phi + e(x) \cdot f(\phi) \quad (2)$$

where $e(x) \cdot f(\phi)$ denotes an error term. The error increases exponentially as $\phi$ (the variable range) becomes larger. It has therefore been impossible to use a too large value for $\phi$ (a very wide variable range).

In order to solve this problem, one of the inventors of this invention has previously proposed a variable equalizer whose characteristic or variable transfer function is described as $$e^\psi = \frac{X^n + b_{n-1} X^{n-1} + \ldots + e^\psi}{e X^n + b_1 X^{n-1} + \ldots + 1} \quad (3)$$

The realization of this variable function, however, was too complicated for practical use.

SUMMARY OF THE INVENTION

The principal object of this invention is to provide a variable equalizer which has a wide variable range and which is made up of a comparatively simple circuit arrangement.

Another object of this invention is to provide a variable equalizer which exhibits small compensation errors over a wide variable range.

In order to accomplish the objects, this invention constructs the variable equalizer as stated below.

A plurality of (hereinafter, expressed by $n$) circuits having variable transfer coefficients, i.e., variable transmission circuits are connected in series between the input and output of the variable equalizer, and there are provided circuits of feed-back from the output sides of the individual variable transmission circuits to the input end through transmission networks having specified transmittances, and circuits of feed-forward from the input sides of the individual variable transmission circuits to the output end of the variable equalizer through networks having specified transmittances.

As will be described in detail later, according to the variable equalizer of this invention, the same transfer function as Eq. (3) previously stated is obtained, whereby compensation errors can be made small over a wide range, and the numbers of variable elements and adders which are the main constituents of the variable equalizer can be made extraordinarily small. This brings forth an economical advantage, and in addition, provides an effective expedient in that in general, uniform control of variable elements are very important in order to realize a variable equalizer of good characteristics, the invention being easy to make the control uniform owing to the small number of elements.

The above-mentioned and other objects and advantages of this invention will become more apparent from the following description taken in connection with the drawings.

DESCRIPTION OF THE PREFERRED EMBODIMENTS

First of all, the characteristic of a variable equalizer and those of prior art variable equalizers will be briefly stated in order to facilitate understanding of this invention.

Figure 1:
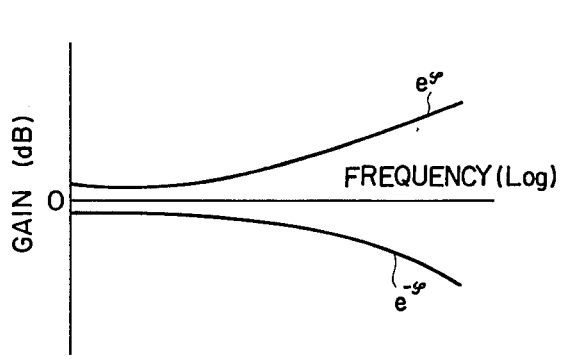
FIG. 1 shows the gain variation characteristic of a transmission line from the reference for explaining the principle of a variable equalizer.

FIG. 1 conceptually shows the loss or gain variation characteristic of a transmission line. The axis of abscissas represents the frequency logarithmically, while the axis of ordinates represents the gain in decibel. In general, the frequency-amplitude characteristic of a transmission line is expressed by $e^{l\sqrt{f/f_c}}$ (where $e$ denotes the base of natural logarithm, $l$ the transmission distance, $f$ the frequency, and $f_c$ a constant inherent to the cable) due to characteristics inherent to the line. This is called the reference characteristic. The frequency-amplitude characteristic deviate from the reference characteristic in dependence on the external ambient temperature conditions. FIG. 1 illustrates the deviation from the reference characteristic as a function of the frequency. As shown in the figure, the range of the gain variation exhibits changes proportional to the reference characteristic and symmetric thereto.

A variable equalizer compensates for the gain variation, and intends to make the output constant irrespective of the frequency over the entire frequency range of FIG. 1. It is difficult, however, to make compensation perfectly over all frequency range for all values of the variable coefficient.

Figure 2:
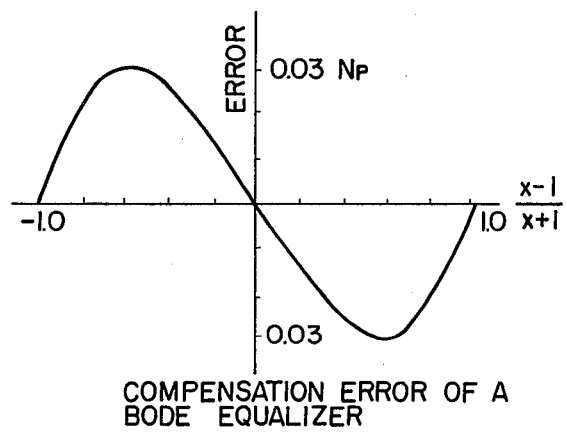
FIGS. 2 and 3 are characteristic diagrams showing compensation errors of a Bode type variable equalizer and a variable equalizer which has previously been proposed by one of the inventors of this invention, respectively.
Figure 3:
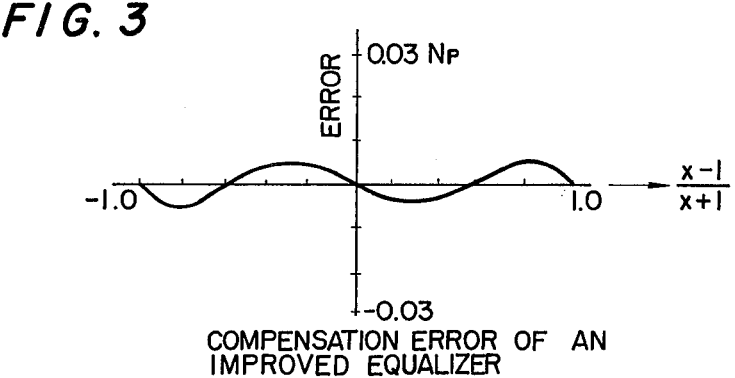

FIGS. 2 and 3 are characteristic diagrams showing the compensation errors of respective equalizers having the transfer characteristics of Eqs. (1) and (3) described previously, in the case where the variable coefficient $x$ changes from 0 (zero) to ∞ (infinity), i.e., where $(x - 1)/(x + 1)$ changes from $-1$ to $+1$.

Where the variable range $\phi$ is made 1 neper, the error attains to 0.03 neper in the case of FIG. 2. The error increases exponentially as the variable range $\phi$ becomes greater. FIG. 3 corresponds to a case where $n = 2$ and $b_1 = 0.3$ in Eq. (3), and the compensation error is greatly improved over that in FIG. 2.

Figure 4:
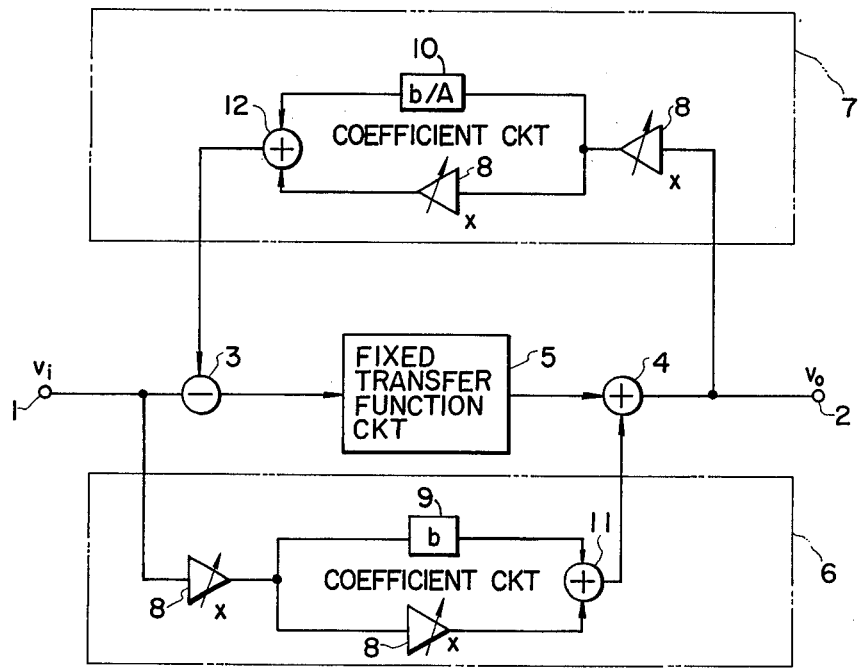
FIG. 4 is a circuit diagram showing the construction of an example of the variable equalizer previously proposed by the inventor.

FIG. 4 is a circuit diagram of an example of the variable equalizer which has the transfer characteristic of Eq. (3) and which has previously been proposed by one of the inventors of this invention. Referring to the figure, the network 5 which has a fixed transfer coefficient $A = e^{\phi}$ is provided between the input terminal 1 and the output terminal 2 of the variable equalizer, and the input signal is added by the adder 4 to the output of the circuit 5 through a feed-forward circuit 6 which consists of variable coefficient circuits 8, a fixed coefficient network 9, and an adder 11. Further, a part of the output signal of the adder 4 is added by the adder 3 to the input of the circuit 5 through the feed-back circuit 7 which consists of the variable coefficient circuits 8, the fixed coefficient circuit 10, and the adder 12.

The transfer characteristics $a_1$ and $a_2$ of the feed-back circuit 7 and the feed-forward circuit 6, respectively, are described as:

$$a_1 = x(x + \frac{b}{A}) = x^2 + \frac{b}{A}x \qquad (4)$$

$$a_2 = x(x + b) \qquad (5)$$

Accordingly, the transfer characteristic $e^{\psi}$ of the whole equalizer becomes:

$$e^{\psi} = \frac{x^2 + b \cdot x + e^{\phi}}{A \cdot x^2 + b \cdot x + 1} \qquad (6)$$

Thus, the equalizer has the same transfer characteristic as that of Eq. (3) where $n = 2$. Such a variable equalizer, however, requires a large number of variable coefficient circuits (four in FIG. 4) with the possibility that a serious deviation from the designed in characteristics may occur and additionally that extremely expensive equalizer which is disadvantageous with regard to cost may be necessary.

Figure 5:
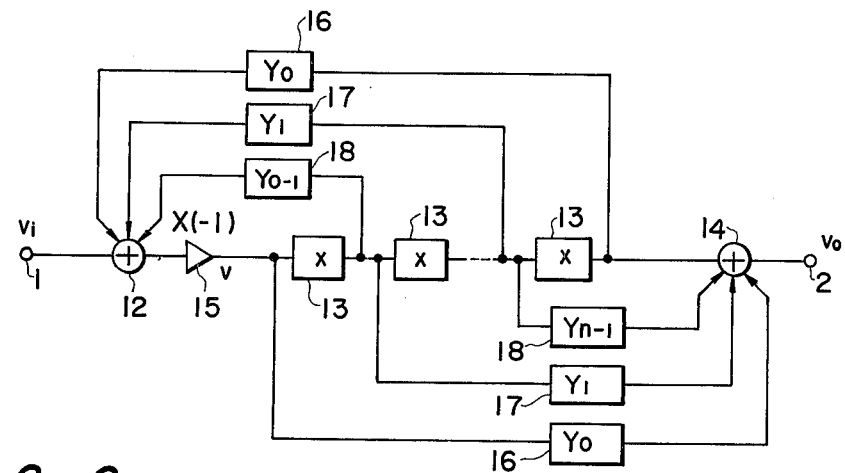
FIGS. 5 and 6 are block diagrams showing the constructions of embodiments of a variable equalizer according to this invention.

FIG. 5 is a block diagram which shows the construction of an embodiment of the variable equalizer according to this invention. A plurality of ($n$) variable circuits 13 having transfer coefficients $x$ are connected in series. Feed-forward and feed-back circuits are formed in such a manner that input and output signals of the circuits 13 are applied from the input end and output end of the respective circuits 13 to the adder 14 on the side of the output terminal 2 and the adder 12 on the side of the input terminal 1 through circuits 16, 17 ... and 18 respectively having transmission characteristics $Y_o$, $Y_1$ ... and $Y_{n-1}$, respectively. In case of this embodiment, the output signal of the adder 12 on the input terminal side has its polarity inverted by the inverter 15. The transfer characteristic or transfer function $e^{\psi}$ of the variable equalizer of the embodiment can be expressed as follows:

$$e^{\psi} = \frac{v_o}{v_i} = \frac{x^n + Y_{n-1}x^{n-1} + \ldots + Y_1 x + Y_0}{Y_0 x^n + Y_1 x^{n-1} + \ldots + Y_{n-1}x + 1} \qquad (7)$$

where $v_o$ and $v_i$ denote the output voltage and the input voltage, respectively. This indicates that Eq. (3) is realized.

Figure 6:
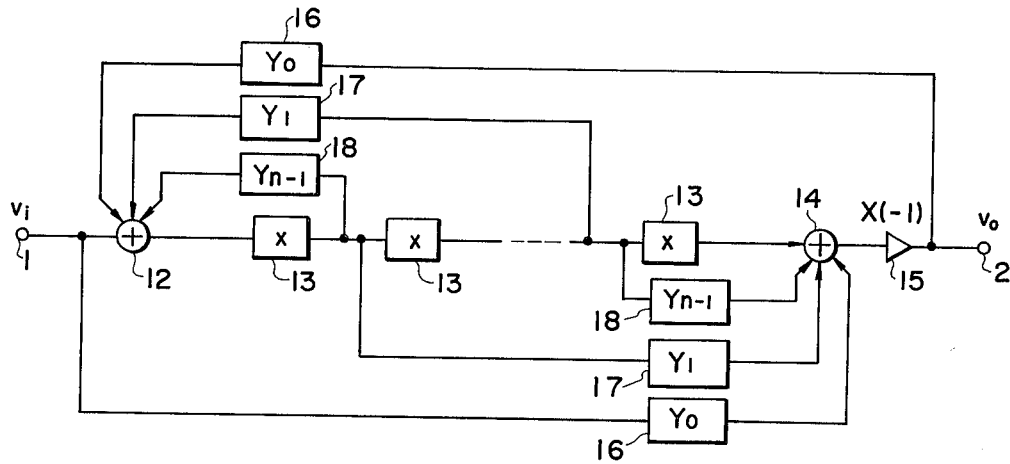

FIG. 6 is the block diagram which shows the construction of another embodiment of the variable equalizer according to this invention. In the figure, constituent blocks having the same functions as in FIG. 5 are assigned the same numerals. The present embodiment is substantially the same as the embodiment of FIG. 5, and as apparent from FIG. 6, the former differs from the latter only in that the feed-back and feed-forward provided by the transmission networks 16 having the coefficient $Y_o$ are applied from outside the adders 14 and 12, respectively, and that the inverter 15 is located on the output side.

The transfer function $e^{\psi}$ of this variable equalizer is described as follows:

$$e^{\psi} = \frac{v_o}{v_i} = \qquad (8)$$

$$\frac{x^n + (Y_{n-1} + Y_0 Y_1)x^{n-1} + \ldots + (Y_1 + Y_0 Y_{n-1})x + Y_0}{Y_0 x^n + (Y_1 + Y_0 Y_{n-1})x^{n-1} + \ldots + (Y_{n-1} + Y_0 Y_1)x + 1}$$

It is understood that this also realizes Eq. (3).

Although it has been described in the above embodiments that all the variable coefficients $x$ of the variable circuits 13 are identical, it will become apparent from the embodiment to be explained later that such is not always necessary. The same applies to the transmission networks 16, 17, and 18. Furthermore, in case where $Y_i = Y_{n-i}$ holds, a single circuit can be commonly used for two transmission networks, and the circuit arrangement can be more simplified.

Figure 7:
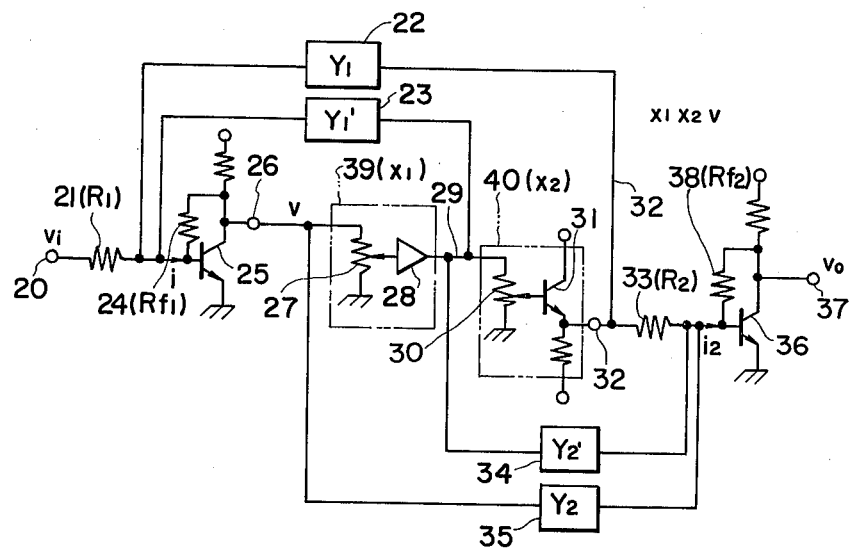
FIG. 7 is a circuit diagram of an embodiment of the variable equalizer according to this invention.

FIG. 7 shows an example of concrete circuit for the variable equalizer according to this invention. It corresponds to a construction in which $n$ is made two in the variable equalizer illustrated in FIG. 5.

Here, a current is caused to flow through the resistor 21 by the voltage $v_i$ applied to the input terminal 20. It becomes the current $i$ after currents fed back through transmission networks 22 and 23 have been added thereto. The current $i$ appears as the voltage $v$ at the terminal 26 under the actions of the resistance 24 and the transistor 25 (in this case, the relation of $v = R_{fl} \cdot i$ holds).

The voltage $v$ becomes a current of a value $v \cdot Y_2$ through a transmission network 35 having a transfer admittance $Y_2$. On the other hand, the voltage $v$ is multiplied by $x_1$ by means of the variable transmission circuit 39 consisting of the potentiometer 27 and the amplifier 28, and a voltage of a value $x_1 \cdot v$ appears at a terminal 29.

The voltage $x_1 \cdot v$ is converted into a current of a value $Y_1' \cdot v \cdot x_1$ through the transmission network 23. On the other hand, it is multiplied by $x_2$ through the variable transmission circuit 40 consisting of a potentiometer 30 and the emitter follower 31, and a voltage of a value $x_1 \cdot x_2 \cdot v$ appears at the terminal 32.

This voltage is applied to a transmission network 22. On the other hand, it is converted through the resistor 33 into a current, which is added with the currents from the transmission networks 34 and 35. A current $i_2$ after the addition appears as a voltage of $v_o = i_2 R_{f2}$ at the output terminal 37 under the actions of the resistor 38 and the transistor 36.

Accordingly, the transfer function of this circuit arrangement becomes:

$$\frac{v_o}{v_f} = \frac{R_{f1} R_{f2} x_1 x_2 + R_2 Y_2' x_1 + R_2 Y_2}{R_1 R_2 Y_1 R_{f1} x_1 x_2 + R_{f1} Y_1' x_1 + 1} \quad (9)$$

Here, putting $$\frac{R_{f1} R_{f2}}{R_1 R_2} = 1,$$

$$Y_1 R_{f1} = Y_2 R_2 = y,$$

$$\frac{x_1}{a} = a x_2 = x \ (a: \text{arbitrary contant}) \text{ and}$$

$$R_2 Y_2' = R_{f1} Y_1' = \frac{k}{a},$$

yields $$\frac{v_o}{v_1} = \frac{x^2 + k x + y}{y x^2 + k x + 1} \quad (10)$$

It is therefore understood that the case where $n = 2$ in Eq. (3) can be realized by the two variable transmission circuits, i.e., variable transfer coefficient circuits 39 and 40.

Putting $k = 2\sqrt{y}$ in Eq. 10, $$\frac{v_o}{v_i} = \left( \frac{x + \sqrt{y}}{\sqrt{y} \, x + 1} \right)^2 \quad (11)$$

This is the characteristic obtained by the cascading of two stages of variable equalizers each having a variable characteristic $\sqrt{y}$. In this manner, it is possible to endow the single stage with the characteristic corresponding to two stages. Likewise, it is easily proved that, using $n$ variable transfer circuits, a characteristic corresponding to $n$ stages can be realized by a single stage. It is also apparent that $Y_1'$ and $Y_2'$ can be made common in FIG. 7.

Thus, the numbers of the variable elements and the adders are respectively reduced to ½ of those in the prior art, and the circuit arrangement is simplified. Therefore, the circuitry is economical, and the improvement of the performance can be expected.

As set forth above, according to this invention, precision variable equalizers can be realized by a very simple circuit, and further, the variable equalizer having heretofore been of the multistage construction can be arranged in one stage. These are greatly effective from the viewpoint of the economization of the circuit arrangement.

What is claimed is:

1. A variable equalizer comprising:
   an input terminal,
   an output terminal,
   a first adder, a plurality of variable transmission circuits having variable transfer coefficients, and a second adder which are connected in series and in the sequence mentioned between said input and output terminals,
   a plurality of feed-back circuits which are connected between output sides of the respective variable transmission circuits and said first adder, and
   a plurality of feed-forward circuits which are connected between input sides of the respective variable transmission circuits and said second adder.

2. The variable equalizer according to claim 1, wherein said variable transfer coefficients of said plurality of variable transmission circuits are equal.

3. The variable equalizer according to claim 1, wherein transmission characteristics of said plurality of feed-back and feed-forward circuits which are connected to the transmission circuits of the same orders from the input and output sides, respectively, are set to be equal.

4. The variable equalizer according to claim 1, further comprising an inverter for inverting a polarity being connected between said first adder and a first one of said variable transmission circuits.

5. A variable equalizer comprising:
   an input terminal,
   an output terminal,
   a first adder, a plurality of variable transmission circuits having variable transfer coefficients and connected in series, a second adder, and an inverter for polarity inversion which are connected in series and in the sequence mentioned between said input and output terminals,
   a plurality of feed-back circuits which are provided between said output terminal as well as connection points of the individual variable transmission circuits and said first adder, and
   a plurality of feed-forward circuits which are provided between said input terminal as well as connection points of the individual variable transmission circuits and said second adder.

6. The variable equalizer according to claim 5, wherein said variable transfer coefficients of said plurality of variable transmission circuits are equal.

* * * * *